United States Patent
Schweitzer, III (10) Patent No.: US 10,368,147 B2
(45) Date of Patent: Jul. 30, 2019

(54) SERVICE AVAILABILITY MONITOR

(71) Applicant: Schweitzer Engineering Laboratories, Inc., Pullman, WA (US)

(72) Inventor: Edmund O. Schweitzer, III, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 15/433,420

(22) Filed: Feb. 15, 2017

(65) Prior Publication Data

US 2018/0234745 A1     Aug. 16, 2018

(51) Int. Cl.
*H04Q 9/00*     (2006.01)
*H04L 12/24*    (2006.01)
*H04L 12/26*    (2006.01)
*G08B 19/00*    (2006.01)

(52) U.S. Cl.
CPC ........... *H04Q 9/00* (2013.01); *H04L 41/5012* (2013.01); *H04L 41/5032* (2013.01); *H04L 43/10* (2013.01); *G08B 19/00* (2013.01); *H04L 41/0213* (2013.01); *H04L 43/045* (2013.01); *H04L 43/08* (2013.01); *H04Q 2209/30* (2013.01); *H04Q 2209/40* (2013.01); *H04Q 2209/823* (2013.01)

(58) Field of Classification Search
None
See application file for complete search history.

(56) References Cited

U.S. PATENT DOCUMENTS

| | | | | |
|---|---|---|---|---|
| 5,955,946 A * | 9/1999 | Beheshti | ............... | H04M 11/04 340/3.1 |
| 2003/0184436 A1* | 10/2003 | Seales | ................. | G08B 25/016 340/531 |
| 2007/0099667 A1* | 5/2007 | Graham | ................. | H01Q 1/007 455/562.1 |
| 2011/0228046 A1* | 9/2011 | Arling | ................. | H04N 13/398 348/42 |
| 2014/0005859 A1* | 1/2014 | Baskin | ............... | G07C 9/00309 701/2 |

(Continued)

OTHER PUBLICATIONS

"Network Interface Cards Explained," Bradley Mitchell, Lifewire, Dec. 18, 2018, accessed Jan. 3, 2019, <https://www.lifewire.com/definition-of-nic-817866> (Year: 2018).*

(Continued)

*Primary Examiner* — Laura N Nguyen
(74) *Attorney, Agent, or Firm* — Jared L. Cherry (57) ABSTRACT

The present disclosure relates to a service availability monitor for interfacing with a monitored service, determine an availability of the monitored service, log the availability of the monitored service, generate a user notification in event of interruption, and communicate the user notification. The service availability monitor may include a primary power subsystem configured to draw power from a primary power source, and a backup power subsystem configured to draw power from the primary power subsystem and provide power to the monitor when power is unavailable through the primary power subsystem. The service availability monitor may monitor an electrical power service, an Internet service a telephone service, a television service, or the like.

24 Claims, 6 Drawing Sheets

(56) References Cited

U.S. PATENT DOCUMENTS

| | | | | |
|---|---|---|---|---|
| 2014/0269610 A1* | 9/2014 | Hiben | ................... | H04W 36/14 |
| | | | | 370/331 |
| 2015/0061858 A1* | 3/2015 | Malnati | .................... | G08B 7/06 |
| | | | | 340/501 |
| 2015/0156090 A1* | 6/2015 | Paine | ................. | H04L 41/5012 |
| | | | | 709/224 |
| 2015/0207716 A1* | 7/2015 | Sexton | .................... | H04L 43/10 |
| | | | | 370/241 |
| 2015/0263913 A1* | 9/2015 | De Temmerman | ... | H04L 43/045 |
| | | | | 709/224 |
| 2016/0234036 A1* | 8/2016 | Hatambeiki | ........ | H04L 12/2814 |
| 2016/0253077 A1* | 9/2016 | Kellner | ............... | G06F 3/04847 |
| | | | | 715/788 |
| 2017/0109253 A1* | 4/2017 | Shen | .................... | G06F 11/364 |

OTHER PUBLICATIONS

Sensaphone Remote Monitoring Solutions, Sensaphone WEB600 brochure, www.sensaphone.com, Sep. 2014.
Sensaphone Remote Monitoring Solutions, Sensaphone WSG30 brochure, www.sensaphone.com, Dec. 2013.

* cited by examiner

SERVICE AVAILABILITY MONITOR

TECHNICAL FIELD

This disclosure relates to systems and methods for determining the availability of services in various circumstances. More particularly but not exclusively, this disclosure relates to systems and methods for monitoring the availability of services in homes and businesses and reporting the availability of such services to a user.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A variety of services are commonly provided to businesses and households in exchange for a fee. Such services may include, but are not limited to telephone, internet connectivity, cable or satellite TV, security, electrical power, etc. Critical infrastructure may rely on such services for operation. For example, proper operation of electrical power systems may rely on the availability of operators to contact remote locations using various technologies, including modems, radio communication links, and the like. Further, the security systems used to monitor remote locations are increasingly reliant on Internet connectivity to relay information about the security of remote sites. When channels of communication are unavailable, the effectiveness of such systems may be reduced or the systems may be rendered completely ineffective. Still further, such services are increasingly important for individual safety and security. For example, such services may provide a life-line to help in the event of an emergency or be used to provide critical information.

In the event that the necessary services are unavailable, a user may be left without necessary help or information. Still further, the unavailability of a service may have serious consequences. For example, a lengthy power outage during a period of cold weather may disable a heating system, and pipes in a building may freeze and burst causing a flood. Even if the situation is not dire, the loss of services may result in inconvenience for users. Still further, there may also be circumstances in which users are paying for a particular service even if the service is not available for extended periods of time.

Various embodiments consistent with the present disclosure may be configured to notify users of service outages. Based on such notifications, a user may gauge the reliability of the services. Where appropriate, a user may implement redundancy or implement other strategies for optimizing the costs and benefits offered by the service.

In some embodiments, information about the reliability of various service providers may be logged over time. A user may review the log to assess the value of the service in light of the service's reliability. Moreover, information from a plurality of service availability monitors in various locations may provide valuable information regarding the reliability of various services. Such information may be used by the service providers to identify areas for improvements, provided to consumers to permit consumers to assess reliability of competing services, used by advertisers to target customers who may desire improved reliability, and/or provided for a variety of other uses.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be illustrated as software modules or components. In other embodiments, hardware-implemented embodiments may be used. Such embodiments may utilize, among other technologies, field-programmable gate arrays. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Figure 1A:
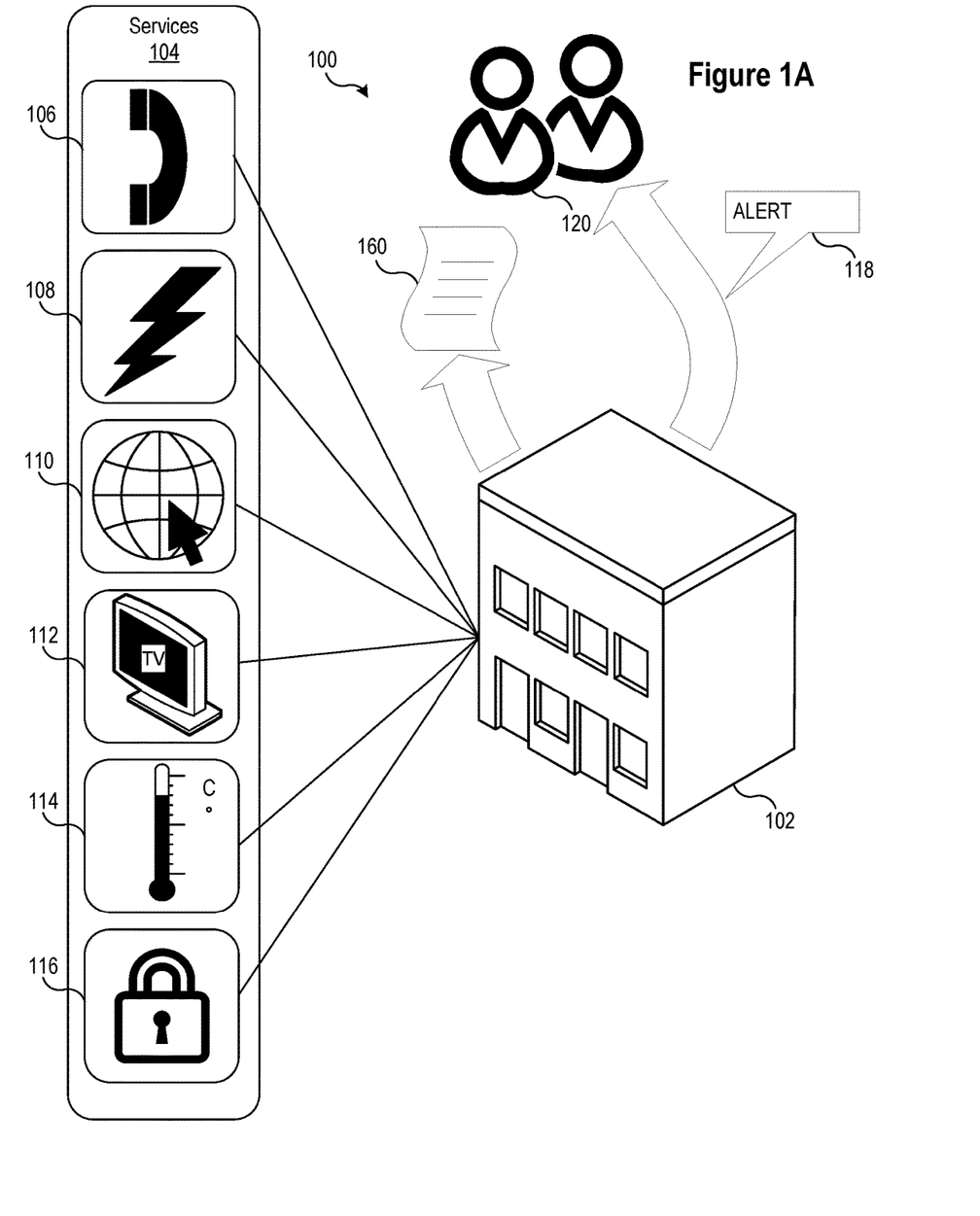
FIG. 1A illustrates a conceptual diagram of a system configured to monitor and to log the availability of services in homes and businesses and reporting the availability of such services to a user consistent with certain embodiments of the present disclosure.

FIG. 1A illustrates a conceptual diagram of a system 100 configured to monitor and to log the availability of services in homes and businesses and reporting the availability of such services to a user 120 consistent with certain embodiments of the present disclosure. A variety of services 104 may be provided to building 102. A variety of other types of services that are not specifically illustrated may also be provided in other embodiments. A service availability monitor, as described herein, may be configured to monitor the services 104 and determine when such services are unavailable. Based on the availability or unavailability of the services, an alert 118 may be sent to the user 120. The alert 118 may be delivered in a variety of ways, including e-mail, text message, phone calls, and the like. In some embodiments, the delivery mechanism may be determined by which services are available and unavailable at the time that an alert is to be determined. For example, if an Internet connection is unavailable during an outage, an alert may be delivered via the telephone system.

In various embodiments, building 102 may comprise a home, an office building, an apartment building, or other structure. Embodiments consistent with the present disclosure may be utilized in structures that are only temporarily occupied (e.g., vacation homes) to help an owner ensure that the building is secure and to detect issues that could result in damage to the building or property in the building (e.g., unauthorized entry, frozen pipes, etc.). Of course, systems and methods consistent with the present disclosure may also be utilized in buildings that are occupied.

In various embodiments, building 102 may also comprise a remote or unmanned facility. A variety of industries may operate unmanned remote facilities, including electrical power utilities. Under typical conditions, such unmanned locations may be continuously connected or selectively connected as needed to a manned location. Locations that are selectively connected may utilize, for example a modem or a cellular telephone network may be utilized to transmit or receive data to or from another facility. Monitoring the availability of services at the remote facility may help to ensure that communication with the unmanned facility is available when necessary (e.g., when a setting needs to be modified to maintain the stability of an electrical power system, when information needs to be transmitted to a manned facility regarding conditions at the unmanned facility, etc.).

In the illustrated embodiment, various utility and other services are provided to building 102. Such services include services for the telephone 106, electricity 108, Internet 110, television 112, heat 114, and security 116. Telephone service 106 may include landline services (POTS), cellular telephone services, and voice-over-Internet Protocol (VoIP) services. When the service availability monitor is configured to monitor a POTS telephone service, the service availability monitor may detect an on-hook voltage, a dial tone, an ability to call out, and/or an ability to receive a call. Television service 112 may include various types of television systems, including cable television systems, satellite television systems, and over-the-air broadcast television. Various types of Internet services may also be monitored, including cable internet, a digital subscriber link (DSL), and various wireless Internet services. In some embodiments, Internet connectivity may be monitored using a ping test conducted on a fixed schedule.

An alert 118 may be delivered to a user 120 upon the occurrence of various conditions. In various embodiments, the conditions that trigger an alert 118 may be specified by the user 120. For example, a user may configure the service availability monitor to generate an alert when the electrical service 108 is unavailable for a specified period of time (e.g., 60 minutes) and to generate another alert when the electrical service is restored. As may be appreciated, an extended power outage may cause food in a refrigerator or freezer to reach an unsuitable temperature for proper preservation. If the user is not present to observe the duration of an electrical outage, the user may be unaware that food stored in a freezer has thawed and refrozen. If a user is notified of the outage, the user may know to check on perishable foods or other items. Similarly, if a remote location includes a backup source of power, such as a generator that utilizes stored fuel, an extended outage may consume all of the fuel. Upon receipt of a notification of an extended outage, a user may take appropriate action to replenish the fuel.

In various embodiments, the availability of services 104 may be logged in a log 160. The log 160 may be embodied in a variety of ways, including, for example, plain text files, XML files, delimited data files, database formats, etc. The log 160 may permit a user to assess the reliability of a particular service. Such information may permit a user to implement redundancy or implement other strategies for optimizing the costs and benefits offered by the service. Further, and as discussed in greater detail below, log files associated with a plurality of devices may be agglomerated to assess reliability on a larger scale. Such information may be used by the service providers to identify areas for improvements, provided to consumers to permit consumers to assess reliability of competing services, and/or provided for a variety of other uses.

Figure 1B:
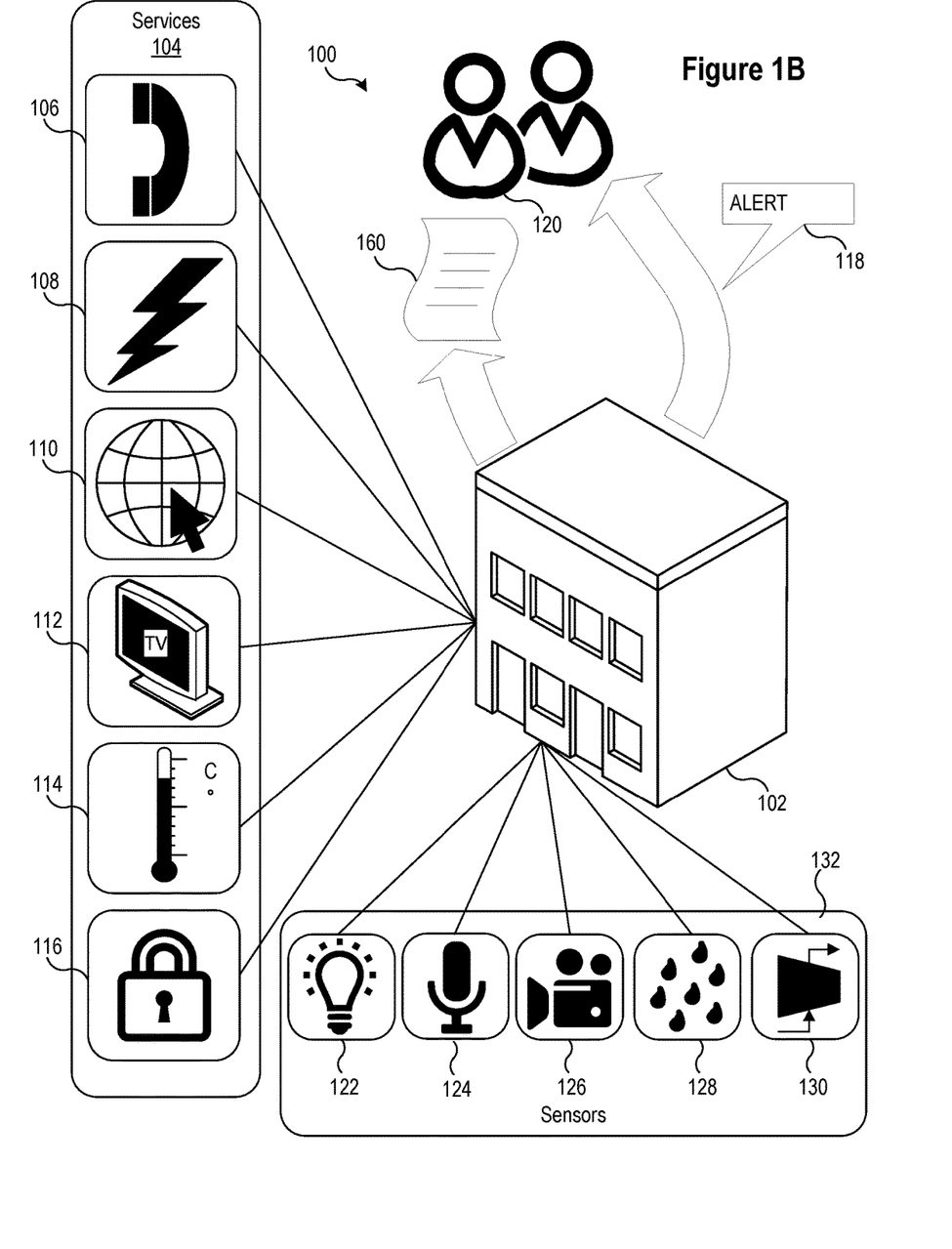
FIG. 1B illustrates the system of FIG. 1A and further includes a sensor interface configured to incorporate information from a variety of sensors located in a building consistent with embodiments of the present disclosure.

FIG. 1B illustrates the system 100 of FIG. 1A and further including a sensor interface configured to incorporate information from a variety of sensors 132 located in a building consistent with embodiments of the present disclosure. In the illustrated embodiment, the sensors 132 include a light sensor 122, a sound sensor 124, a video sensor 126, a water sensor 128, and a pump sensor 130. In other embodiments, more, fewer, or different sensors may be utilized. Such sensors may include, motion detectors, contact sensors configured to determine when a door or window is opened, accelerometers, humidity sensors, temperature sensors, smoke detectors, CO2 detectors, etc. In various embodiments, a service availability monitor consistent with the present disclosure may not encompass the plurality of sensors, but rather may include an interface from which the service availability monitor may receive information from the sensors. The interface may comprise a wired or wireless interface. In one specific embodiment, the service availability monitor and the plurality of sensors may be configured to communicate using a wireless data communication protocol, such as the IEEE 802.11 family of communication protocols, Bluetooth, Zigbee, etc.

The sensors illustrated in FIG. 1B, may be configured to help ensure that building 102 is secure and to detect issues that could result in damage to the building or property in the building (e.g., unauthorized entry, frozen pipes, etc.). For example, the light sensor 122, sound sensor 124, and video sensor 126 may be configured to detect unauthorized entry to the building 102. The light sensor 122 may be simple to implement and may be particularly effective when deployed in a dark unmanned facility. The presence of light (e.g., from opening a door, turning on a light, etc.) may trigger a light detection circuit, which in turn, may generate an alert 118. Similarly, a sound sensor may be configured to detect sound indicative of unauthorized entry or use of building 102 and may cause a service availability monitor to generate an alert 118.

In various embodiments, information from the plurality of sensors 132 may trigger alerts 118 in a similar manner to alerts triggered by the unavailability of services 104. As discussed above, a user may be permitted to specify the types of alerts the user desires to receive based on conditions detected by the sensors. For example, a user may specify that detection of water should trigger an immediate alert. In another example, a pump 130 may be operable to drain water from a particular location. The pump may also be configured to conduct periodic self-tests to ensure that the pump is operating properly. Such a pump is described in greater detail in U.S. patent application Ser. No. 14/491,106, which is titled Test and Monitoring System for a Dual Sump Pump System; U.S. patent application Ser. No. 14/491,135, which is titled Test and Monitoring System for a Battery-Powered DC Pump Installation; U.S. patent application Ser. No. 14/491,207, which is titled Test and Monitoring System for a Sump Pump Installation having a Self-Monitoring Valve Module for Admitting Water to the Sump Pit; U.S. patent application Ser. No. 14/491,239, which is titled Test and Monitoring System for a Sump Pump Installation having a Self-Monitoring Liquid Level Sensing Module; U.S. patent application Ser. No. 14/491,263, which is titled Test and Monitoring System for a Sump Pump Installation having a Variable Test Cycle Time Out; U.S. patent application Ser. No. 14/491,294, which is titled Test and Monitoring System for a Sump Pump Installation Including Trend Analysis of Pump Performance; U.S. patent application Ser. No. 14/491,349, which is titled Test and Monitoring System for a Sump Pump Installation Operable from a Remote Location; U.S. patent application Ser. No. 14/491,377, which is titled Test and Monitoring System for a Sump Pump Installation Having a Self-Protecting Valve Assembly for Admitting Water to the Sump Container; U.S. patent application Ser. No. 14/516,778, which is titled Battery-Powered Backup Power System for a Sump Pump Installation.

If the pump fails a self-test, an alert may be generated so that a user can undertake remedial action and ensure that the pump will operate properly when necessary.

Figure 2:
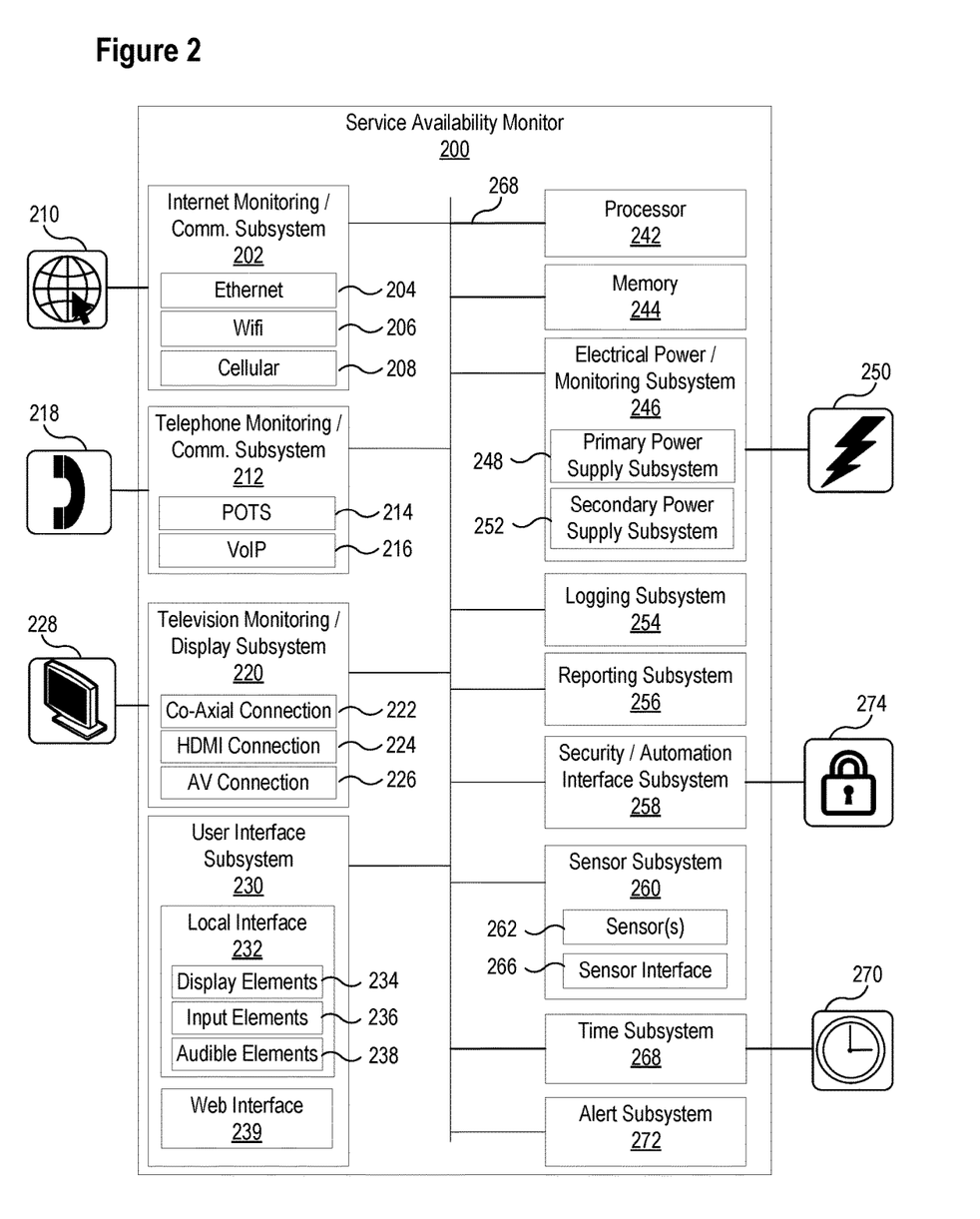
FIG. 2 illustrates a functional block diagram of a service availability monitor configured to monitor and record the availability of services in homes and business and to report the availability of such services to a user consistent with embodiments of the present disclosure.

FIG. 2 illustrates a functional block diagram of a service availability monitor 200 configured to monitor and record the availability of services in homes and business and to report the availability of such services to a user consistent with embodiments of the present disclosure. Service availability monitor 200 may be implemented using hardware, software, firmware, and/or any combination thereof. In some embodiments, service availability monitor 200 may be embodied as a unitary device, while in other embodiments, certain components or functions described herein may be associated with other devices or performed by other devices. In various embodiments, the service availability monitor 200 may utilize a low-cost computer platform, running a real-time operating system (e.g., Linux) or hardware platform (e.g., the Arduino and/or the Raspberry Pi).

The specifically illustrated configuration is merely representative of one embodiment consistent with the present disclosure. For example, a family of devices could be made, ranging from a single-function monitoring system with limited options to a utility-rated monitoring system configured to monitor the reliability services related to critical infrastructure.

An internet monitoring/communication subsystem 202 may be configured to monitor the availability of an Internet service 210 and/or to communicate via the Internet service 210. In some embodiments, the Internet monitoring/communication subsystem may be configured to determine the availability of an Internet connection by initiating Internet communications on a predefined schedule. Such communications may include ping tests of one or more specified Internet servers. In the event that a ping test does not complete successfully, certain embodiments may test multiple Internet addresses. The Internet monitoring communication subsystem 202 may connect to the Internet using a variety of communication technologies, including an Ethernet interface 204, a Wi-Fi interface 206, or a cellular Interface 208. Other interfaces are also contemplated. Such interfaces may be configured to communicate via Internet connections of various types (e.g., cable Internet, DSL, wireless internet systems, etc.)

In addition to monitoring the availability of an Internet connection, Internet monitoring/communication subsystem 202 may be configured to transmit information via the Internet. Such information may include, among other things, alerts to be sent to the user in the event of a disruption in a monitored service and logs relating to the availability of monitored services. In some embodiments, Internet monitoring/communication subsystem 202 may further be configured to allow users to specify various settings associated with service availability monitor 200. Such settings may include, among other things, the conditions that trigger alerts and the format of such alerts.

A telephone monitoring communication subsystem 212 may further be configured to monitor the availability of telephone service 218 and/or to communicate via the telephone service. The telephone service to be monitored may include a POTS interface 214 and a VoIP interface 216, In some embodiments, the telephone monitoring/communication subsystem 212 may be configured to determine the availability of the telephone service by initiating telephone communications on a predefined schedule. Such communications may include initiating outgoing telephone calls and/or receiving incoming telephone calls.

In addition to monitoring the availability of a telephone service, telephone monitoring/communication subsystem 212 may further be configured to transmit information via the telephone service. In some embodiments, the telephone monitoring/communication subsystem 212 may be used to deliver alerts to a user directly through the telephone service. In such embodiments, the service availability monitor 200 may be configured to place a call to the user to communicate the alert. In other embodiments, the telephone monitoring/communication subsystem 212 may be used to connect to the Internet using a modem or other device, and information relating to user alerts and/or availability logs may be transmitted.

A television monitoring subsystem 220 may be configured to monitor the availability of a television service 228. The television monitoring subsystem 220 may be configured to monitor television service provided in various formats, including via a co-axial connection 222, an HDMI connection 224, and/or an AV connection 226. The system may be configured to detect a signal associated with one or more of the interfaces and to determine when the service is unavailable.

A user interface subsystem 230 may be configured to interact with a user. The user interface subsystem 230 may include a local interface 232 and/or a web interface 239 through which the user may specify various settings associated with the service availability monitor 200. The local interface 232 may include display elements 234, input elements 236, and/or audible elements 238. In one embodiment, the display elements 234 may comprise bi-color LEDs that are illuminated green when a service is available and are illuminated red when the service is unavailable. In other embodiments display elements 234 may comprise displays of various types, including segment displays that display an "A" for available or a "U" for unavailable, a matrix display, or another screen capable of displaying variable types of information (e.g., an LED screen).

Input elements 236 may be configured to allow a user to specify settings or provide information to service availability monitor 200. In one embodiment, the input elements may comprise a set of switches, such as DIP switches, to configure the monitor. Such an embodiment may allow for configuration of the service availability monitor without requiring the use of a computer. In other embodiments, the input elements may include various input devices, such as a keyboard, a touch screen, etc. Local interface 232 may further comprise audible elements 238 configured to provide an audible notification to a user. In some embodiments, the audible elements may include a voice and/or Morse code annunciation of loss and return to service. In other embodiments, audible elements 238 may be configured to beep or emit a siren to notify a user of a loss of service.

In some embodiments, a web interface 239 may be configured to allow a user to send or receive information from service availability monitor 200. Web interface 239 may operate in conjunction with Internet monitoring/communication subsystem 202 in various embodiments. The web interface 239 may be accessible by a computer running a web browser, and may permit the user to observe and/or retrieve event information in addition to configuring the service availability monitor 200.

Processor 242 may be configured to execute instructions to implement the functions, features, and method disclosed herein. Processor 242 may operate using any number of processing rates and architectures. Processor 242 may be configured to perform various algorithms and calculations described herein. Processor 242 may be embodied as a general purpose integrated circuit, an application specific integrated circuit, a field-programmable gate array, and/or any other suitable programmable logic device.

Memory 244 comprises a computer-readable storage medium containing code executable on processor 242. Such instruction may comprise various software modules configured to perform any of the methods described herein. A data bus 268 may link the various components and subsystems in service availability monitor 200.

An electronic power/monitoring subsystem 246 may be configured to receive power from an electrical power system 250 and to monitor the availability of electrical power from electrical power system 250. Electrical power/monitoring subsystem 246 may comprise a primary power supply subsystem 248 and a secondary power supply subsystem 252. The primary power supply subsystem 248 may be configured to convert AC power provided by electrical power system 250 to DC power that may be used by service availability monitor 200. In one specific embodiment, the primary power supply subsystem may convert AC electrical power to 12 volt CD power. The secondary power supply subsystem 252 may be configured to provide power to service availability monitor 200 when power from electrical power subsystem 250 is unavailable. In some embodiments, the secondary power supply subsystem 252 may store energy provided by power supply subsystem 248 in a battery or other energy storage device.

A logging subsystem 254 may be configured to log the availability/unavailability of various services monitored by service availability monitor 200. When an outage on one or more services is detected, an entry may be made in a log by logging subsystem 254. The log may be embodied in a variety of ways, including, for example, plain text files, XML files, delimited data files, database formats, etc. The log may permit a user to assess the reliability of a particular service. Such information may permit a user to implement redundancy or implement other strategies for optimizing the costs and benefits offered by the service.

Reporting subsystem 256 may be configured to provide reports of the availability of various services monitored by service availability monitor 200. Reporting subsystem 256 may be configured to use log files created by logging subsystem 254 to generate reports of service availability. In some embodiments, reporting subsystem 256 may be configured to provide information to a system configured to assess reliability on a larger scale. For example, reports may be transmitted to a remote server via Internet monitoring/communication subsystem 202 or telephone monitoring communication subsystem 212. Such a server may receive reports from a plurality of service availability monitors 200 and agglomerate such reports into information that may be used by service providers to identify areas for improvements, provided to consumers to permit consumers to assess reliability of competing services, and/or provided for a variety of other uses.

Security/automation interface subsystem 258 may be configured to monitor the availability of a security/automation service 274. In various embodiments, the security systems may rely on Internet monitoring/communication subsystem 202 or telephone monitoring communication subsystem 212 to transmit information to an operator and/or public agencies, such as fire or police authorities.

A sensor subsystem 260 may comprise one or more sensors 262 and a sensor interface 266. In various embodiments, the sensor 262 may comprise light sensors, sound sensors, video sensors, water sensors, pump sensors, motion detectors, contact sensors, accelerometers, humidity sensors, temperature sensors, smoke detectors, $CO_2$ detectors, etc. In various embodiments, sensors 262 may be comprised within service availability monitor 200, while a plurality of external sensors may communicate with sensor interface 266.

Service availability monitor 200 may include a time subsystem 268. In various embodiments time subsystem may be configured to receive a time input from an external time source 270. Some examples of an external time source 270 include a Global Navigational Satellite System (GNSS) such as the Global Positioning System (GPS) delivering a time signal corresponding with IRIG, a WWVB or WWV system, a network-based system such IEEE 1588. Time subsystem 268 may provide time information such that the times at which outages begin and/or end may be recorded.

An alert subsystem 272 may be configured to deliver alerts to a user using various types of communication. In some embodiments, alerts may be delivered using one or more of email messages, text messages, telephone calls, notifications through mobile applications, audible alerts, etc. Alert subsystem 272 may operate in conjunction with other subsystems and may communicate using various services monitored by service availability monitor 200 to deliver alerts to a user. In one specific embodiment, the Simple Network Management Protocol (SNMP) may be used to exchange device configuration information and issue alerts. Use of such a protocol may facilitate consolidation of information from a variety of devices.

Figure 3:
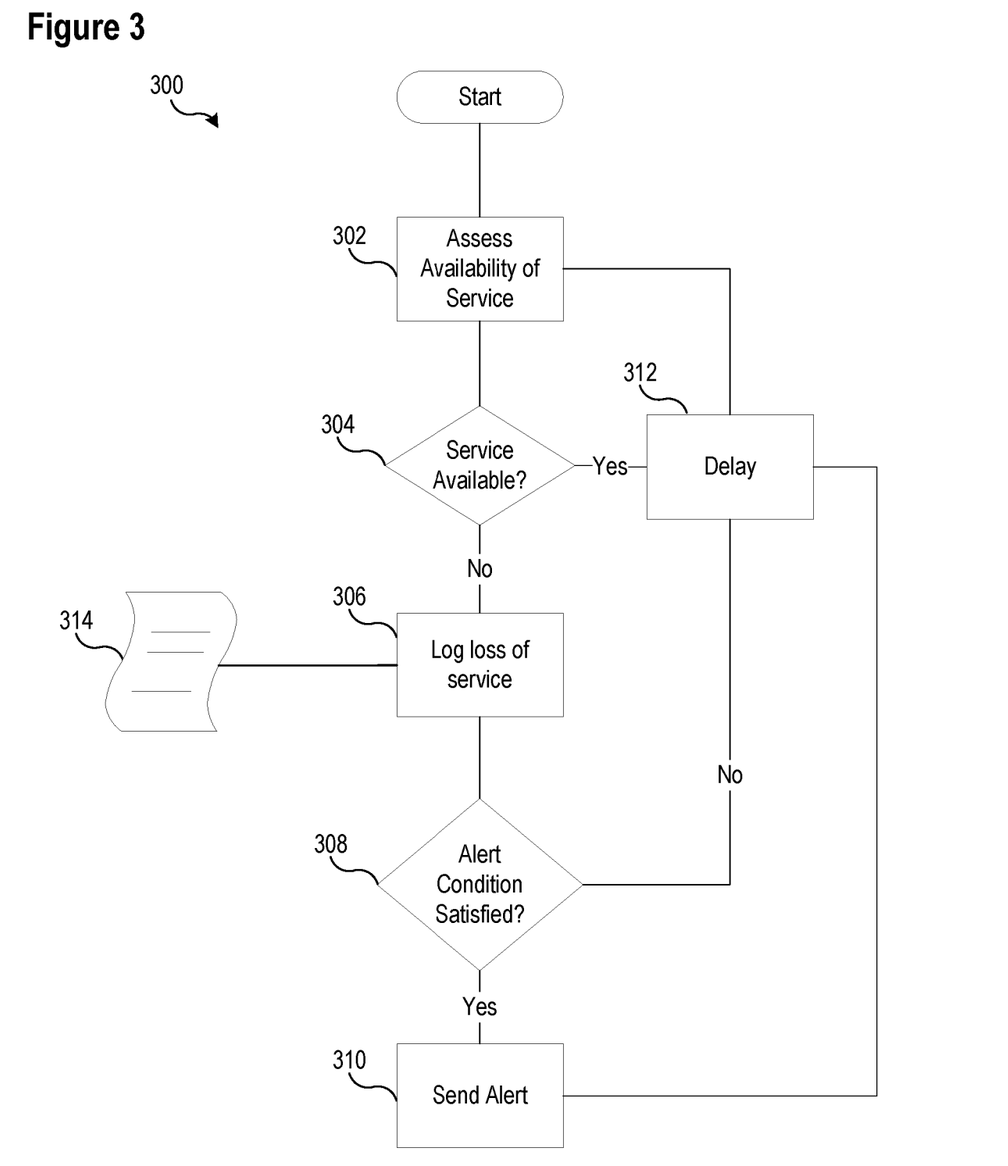
FIG. 3 illustrates a flow chart of a method for monitoring the availability of services in homes and buildings and reporting disruptions in services to a user consistent with embodiments of the present disclosure.

FIG. 3 illustrates a flow chart of a method 300 for monitoring the availability of services in homes and buildings and reporting disruptions in services to a user consistent with embodiments of the present disclosure. At 302, method 300 may assess the availability of one or more services. Various techniques may be utilized to monitor service of various types. For example, where the service to be monitored is a telephone system, the availability of the service may be assessed by initiating outgoing telephone calls and/or receiving incoming telephone calls. In another example, where the service to be monitored is an Internet connection, the availability of the service may be assessed by conducting a ping test of one or more servers.

At 304, method 300 may determine whether the service is available based on the assessment of the service at 302. If the service is available, at 312 may delay a specified period prior to returning to 302. If the service is determined to be unavailable at 304, the unavailability of the service may be logged at 306. A log 314 may be generated that comprises a record of service disruptions. In some embodiments, the log 314 may be transmitted to a system configured to agglomerate logs from a plurality of service availability monitors.

At 308, method 300 may determine whether an alert condition is satisfied by the unavailability of the service. Alert conditions may be specified using a variety of conditions, including the type of service, the duration of the outage, etc. If the condition is not satisfied, method 300 may return to 312. If the condition is satisfied, an alert may be sent at 310. As described above, alerts may be sent using a variety of communication channels (e.g., the Internet, a telephone system, etc.) and in a variety of formats (e.g., email messages, text messages, notifications via a mobile application, telephone calls, etc.).

Figure 4:
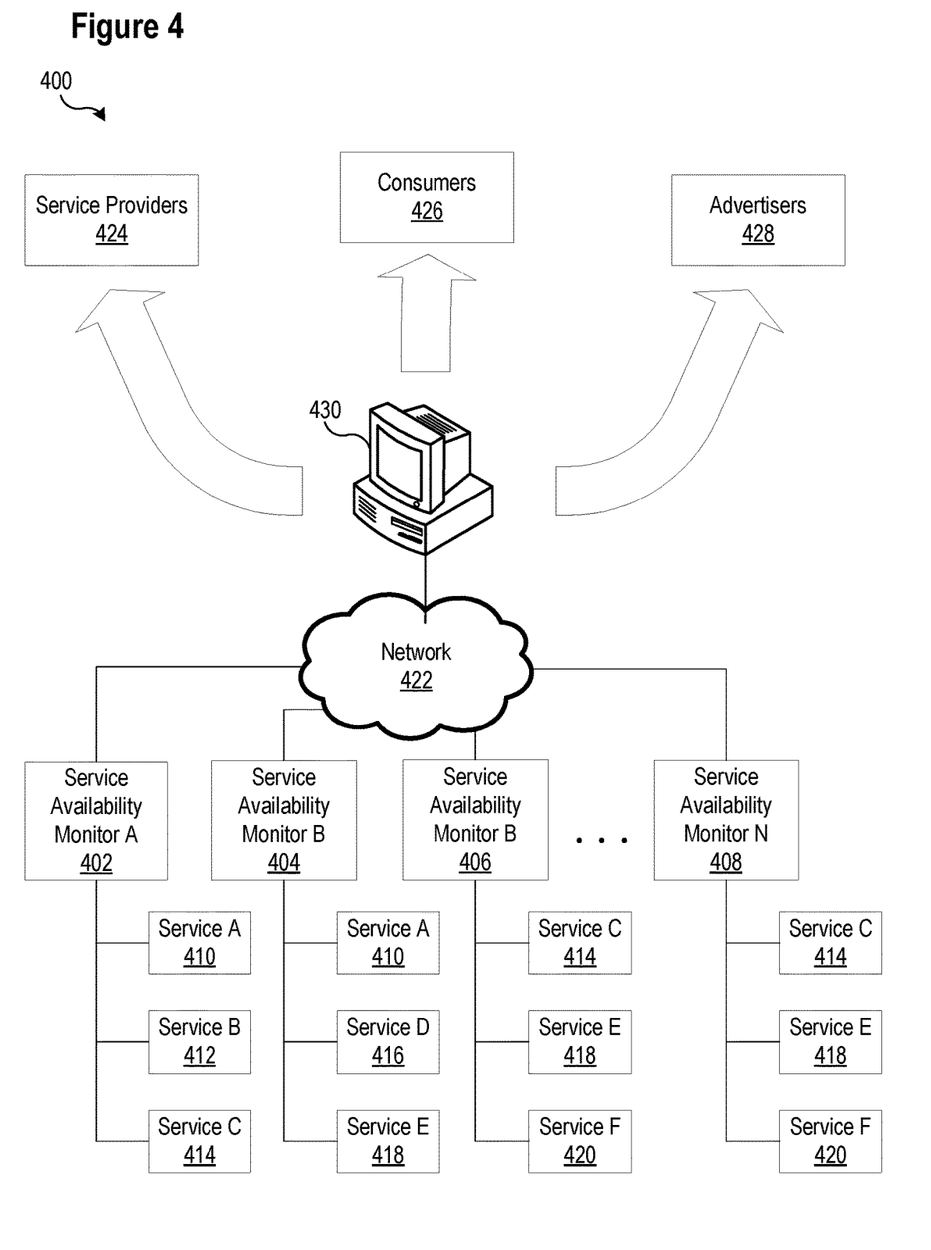
FIG. 4 illustrates a conceptual representation of one embodiment of a system configured to accumulate data from a plurality of service availability monitors to assess the reliability of a plurality of services consistent with certain embodiments of the present disclosure.

FIG. 4 illustrates a conceptual representation of one embodiment of a system 400 configured to agglomerate data from a plurality of service availability monitors to assess the reliability of a plurality of services 410-420 consistent with certain embodiments of the present disclosure. In the illustrated embodiment, system 400 includes a plurality of service availability monitors 402-408 configured to monitor a plurality of services 410-420. As illustrated, a different set of services are provided to different service availability monitors 402-408. In the illustrated embodiment, service availability monitor A 402 monitors service A 410, service B 412, and service C 414; and service availability monitor B 404 monitors service A 410, service D 416, and service E 418. When service A becomes unavailable, the unavailability may be noted by service availability monitor A 402 and service availability monitor B 404, each of which may log the unavailability of service A 410.

Service availability monitors 402-408 may collectively be monitoring a number of services at a variety of geographic areas. Each service availability monitor 402-408 may be in communication with a network 422, using which information about the reliability of services 410-420 may be transmitted to a server 430. Server 430 may agglomerate data from the service availability monitors 402-408 and prepare such information for a variety of uses. For example, such information may be of value to service providers 424 to identify areas for improvements, or to consumers 426 to permit consumers to assess reliability of competing services, or to advertisers 428 for use in targeting advertisements. Where a particular service is unreliable, a competitor may use such information to identify customers who may have experienced numerous outages, and therefore may be looking for alternative services.

Figure 5:
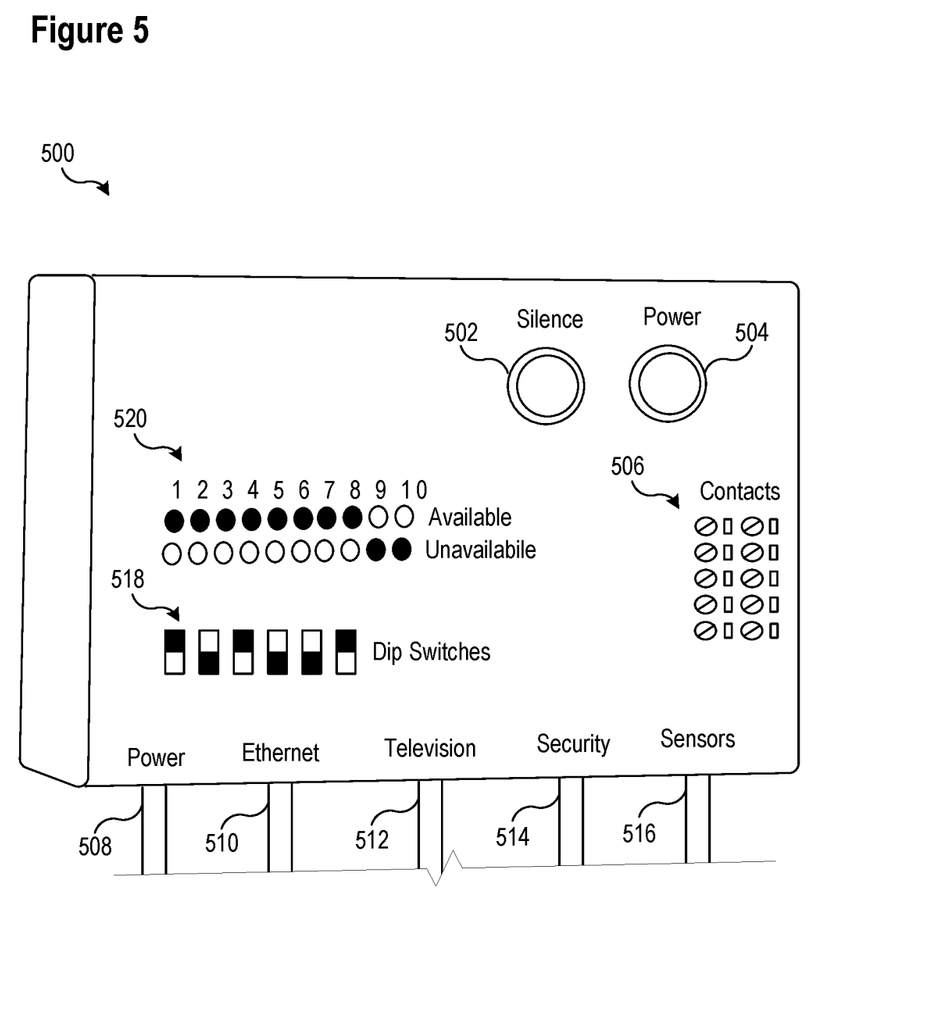
FIG. 5 illustrates a perspective view of one embodiment of a service availability monitor configured to monitor and record the availability of services in homes and business and to report the availability of such services to a user consistent with embodiments of the present disclosure.

FIG. 5 illustrates a perspective view of one embodiment of a service availability monitor 500 configured to monitor and record the availability of services in homes and business and to report the availability of such services to a user consistent with embodiments of the present disclosure. Service availability monitor 500 includes a silence button 502 and a power button 504. The silence button 502 may be used to quiet/acknowledging alerts or alarms resulting from service disruptions. A plurality of LED indicators 520 may be configured to illustrate the availability and unavailability of various services. A plurality of dip switches 518 may be used to specify various settings associated with service availability monitor 500. A plurality of dry contacts 506 may be used to connect to various services and/or sensors monitored by service availability monitor 500. Service availability monitor 500 may also include a power interface 508, an Ethernet interface 510, a television interface 512, a security interface 514, and a sensor interface 516.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A service availability monitor comprising:
   a monitoring subsystem configured to interface with a plurality of monitored services and to determine an availability of the plurality of monitored services provided at a service location at a plurality of times;
   a logging subsystem configured to create a log representing the availability of the plurality of monitored services;
   an alert subsystem configured to generate a first user notification of an interruption of the plurality of monitored services;
   a redundant communication subsystem comprising:
      a first communication interface in communication with a first communication channel, and a second communication interface in communication with a second communication channel, each of the first communication interface and the second communication interface comprising a wired connection capable of propagating electronic signals, wherein the redundant communication subsystem is configured to transmit the first user notification from the service location to a remote location using the first communication interface when the monitoring subsystem determines that the second communication channel is unavailable, and to transmit the first user notification from the service location to the remote location using the second communication interface when the monitoring subsystem determines that the first communication channel is unavailable, the service location being physically separated from the remote location;

a redundant power source, comprising:
   a primary power subsystem configured to draw power from a primary power source to power the service availability monitor; and
   a backup power subsystem configured to draw power from the primary power subsystem and to provide power to the service availability monitor when power is unavailable through the primary power subsystem.

2. The service availability monitor of claim 1, wherein the plurality of monitored services comprise an electrical power service in electrical communication with the primary power subsystem.

3. The service availability monitor of claim 1, wherein at least one of the first communication interface and the second communication interface comprises a modem configured to selectively connect to a network, and the redundant communication subsystem is configured to transmit the first user notification via the network using the modem.

4. The service availability monitor of claim 1, wherein the plurality of monitored services comprise an Internet service.

5. The service availability monitor of claim 4, wherein at least one of the first communication interface and the second communication interface is configured to communicate via the Internet service, and the redundant communication subsystem is configured to transmit the first user notification via the Internet service when the Internet service is available.

6. The service availability monitor of claim 4, wherein at least one of the first communication interface and the second communication interface comprises at least one of an Ethernet interface and a universal serial bus interface.

7. The service availability monitor of claim 4, further comprising a web interface configured to receive a plurality of configuration settings from a user via the Internet service.

8. The service availability monitor of claim 1, wherein the alert subsystem is further configured to generate the first user notification using a Simple Network Management Protocol.

9. The service availability monitor of claim 1, further comprising a time subsystem configured to receive an external time signal and to associate a time specified by the external time signal with the interruption of at least one of the plurality of monitored services.

10. The service availability monitor of claim 1, further comprising a sensor subsystem configured to receive input from at least one sensor relating to an environmental condition.

11. The service availability monitor of claim 10, wherein the at least one sensor comprises one of a light sensor, a sound sensor, a video sensors, a water sensor, a pump sensor, a motion detector, a contact sensor, an accelerometer, a humidity sensor, a smoke detector, a CO2 detector, and a temperature sensor.

12. The service availability monitor of claim 1, wherein the monitoring subsystem comprises a telephone monitoring interface.

13. The service availability monitor of claim 1, wherein the monitoring subsystem comprises a television service interface.

14. The service availability monitor of claim 13, wherein the television service interface comprises one of a co-axial cable input, a high-definition multimedia interface and an audio/video interface.

15. The service availability monitor of claim 14, wherein the television service interface is further configured to display information generated by the service availability monitor on a display element.

16. The service availability monitor of claim 1, wherein the monitoring subsystem comprises a plurality of dry contacts configured to receive an input representing the availability of the plurality of monitored services.

17. The service availability monitor of claim 1, further comprising a plurality of dip switches configured to specify a plurality of configuration settings.

18. The service availability monitor of claim 1, wherein the redundant communication subsystem is further configured to transmit the log representing the availability of the plurality of monitored services to a remote system.

19. A method of monitoring availability of a service, comprising:
   determining an availability of a plurality of monitored services provided at a service location at a plurality of times;
   generating a log representing the availability of the plurality of monitored services;
   generating a first user notification of an interruption of the plurality of monitored services;
   generating a second monitored service provider notification of an interruption of the plurality of monitored services;
   transmitting the first user notification and the second monitored service provider notification from the service location to a remote location using a redundant communication subsystem, the redundant communication subsystem comprising:
     a first communication interface in communication with a first communication channel comprising a first wired connection capable of propagating electronic signals; and
     a second communication interface in communication with a second communication channel comprising a second wired connection capable of propagating electronic signals;
   wherein the redundant communication subsystem is configured to transmit the first user notification and the second monitored service provider notification from the service location to the remote location using the first communication interface when a monitoring subsystem determines that the second communication channel is unavailable, and to transmit the first user notification and the second monitored service provider notification from the service location to the remote location using the second communication interface when the monitoring subsystem determines that the first communication channel is unavailable, the service location being physically separated from the remote location;

receiving power from a primary power source to power the service availability monitor;

storing power from the primary power source using a backup power source; and drawing power from the backup power source when power is unavailable through a primary power subsystem.

20. The method of claim 19, wherein the plurality of monitored services comprise an electrical power service in electrical communication with the primary power subsystem.

21. The method of claim 19, wherein transmitting the first user notification and the second monitored service provider notification comprises selectively connecting to a network using a modem and transmitting the first user notification and the second monitored service provider notification via the network using the modem.

22. The method of claim 19, wherein the plurality of monitored services comprise an Internet connection.

23. The method of claim 19, wherein the plurality of monitored services comprise a television service.

24. A system to monitor availability of a plurality of services at a plurality of service locations provided by a plurality of monitored service providers using a plurality of service availability monitors comprising:

a server in communication with a plurality of service availability monitors, each service availability monitor comprising:

a monitoring subsystem configured to interface with a plurality of monitored services at a plurality of service locations and to determine an availability of the plurality of monitored services at a plurality of times;

a logging subsystem configured to create a log representing the availability of each of the plurality of monitored services;

an alert subsystem configured to generate:

a first user notification of an interruption of at least one of the plurality of monitored services, and a second monitored service provider notification sent to the server;

a communication subsystem comprising:

a first communication channel interface in communication with a first physical medium capable of propagating electronic signals, a second communication channel interface in communication with a second physical medium capable of propagating electronic signals, wherein the communication subsystem is configured to transmit the first user notification and the second monitored service provider notification using at least one of the first communication channel interface and the second communication channel interface;

a primary power subsystem configured to draw power from a primary power source; and a backup power subsystem configured to draw power from the primary power subsystem and to provide power when power is unavailable through the primary power subsystem;

wherein the server agglomerates data from the plurality of service availability monitors to provide an assessment of reliability of at least one of the plurality of monitored services to at least one of the monitored service providers.

* * * * *